United States Patent [19]

Ahamed et al.

[11] Patent Number: 5,978,831
[45] Date of Patent: Nov. 2, 1999

[54] SYNCHRONOUS MULTIPROCESSOR USING TASKS DIRECTLY PROPORTIONAL IN SIZE TO THE INDIVIDUAL PROCESSORS RATES

[75] Inventors: Syed Vickar Ahamed, Somerset; Victor Bernard Lawrence, Holmdel, both of N.J.

[73] Assignee: Lucent Technologies Inc., Murray Hill, N.J.

[21] Appl. No.: 07/666,162

[22] Filed: Mar. 7, 1991

[51] Int. Cl.$^6$ .............................. G06F 9/46; G06F 11/28
[52] U.S. Cl. ........................... 709/105; 712/30; 709/103
[58] Field of Search .................................. 395/800, 650, 395/200, 325, 275, 500, 550, 775, 725, 700, 400, 425, 575, 375, 11, 250; 364/DIG. 1, DIG. 2; 307/465; 370/94.1; 709/4, 5, 6; 712/30

[56] References Cited

U.S. PATENT DOCUMENTS

| | | | |
|---|---|---|---|
| 3,781,822 | 12/1973 | Ahamed | 395/550 |
| 4,251,861 | 2/1981 | Mago | 395/800 |
| 4,312,069 | 1/1982 | Ahamed | 371/37.6 |
| 4,316,061 | 2/1982 | Ahamed | 370/109 |
| 4,403,286 | 9/1983 | Fry et al. | 395/650 |
| 4,495,570 | 1/1985 | Kitajima et al. | 395/650 |
| 4,584,643 | 4/1986 | Halpern et al. | 395/200 |
| 4,589,066 | 5/1986 | Lam et al. | 395/500 |
| 4,742,252 | 5/1988 | Agrawal | 340/825.83 |
| 4,754,398 | 6/1988 | Pribnow | 395/200 |
| 4,811,210 | 3/1989 | McAulay | 395/325 |
| 4,839,798 | 6/1989 | Eguchi et al. | 395/650 |

(List continued on next page.)

FOREIGN PATENT DOCUMENTS

| | | |
|---|---|---|
| 6467676 | 3/1989 | Japan . |
| 9119256 | 12/1991 | WIPO . |

OTHER PUBLICATIONS

James/James, Mathematics Dictionary, 4th Edition, Van Nostrand Reinhold Company, 1976, N.Y., pp. 309–310.

D. Van Nostrand Company, Inc., The International Dictionary of Physics and Electronics, 2nd Edition, Princeton N.J., 1961, p. 907.

L. M. Ni et al., Optimal Load Balancing in a Multiple Processor System with Many Job Classes, IEEE Transactions on Software Engineering, vol. SE–11, No. 5, May 1985, pp. 491–496.

F. Bonomi et al., Adaptive Optimal Load Balancing in a Nonhomogenous Multiserver System with a Central Job Scheduler, IEEE Transactions on Computers, vol. 39, No. 10, Oct. 1990, pp. 1232–1250.

(List continued on next page.)

*Primary Examiner*—Daniel H. Pan
*Attorney, Agent, or Firm*—David Volejnicek

[57] ABSTRACT

Multiprocessor architecture having advantages of both synchronous and asynchronous architectures. The multiprocessor (FIG. 10) comprises processors (300) operating in parallel and synchronously. Each processor operates at a different rate (a), so that each processor processes a data unit (316) in a different amount of time. An input distribution function (317) receives an input stream of data and distributes it to individual processors for processing, in amounts directly proportional to the operating rates of the individual processors, so that each processor processes all of the data distributed to it in the same amount of time as the other processors. Input data buffers (301) connected to processors operate synchronously with the connected processors, receiving and storing the distributed data and inputting it to the connected processors at rates synchronized with the processors' operating rates. Output data buffers (301) operating synchronously with the processors receive and store the processed data, and output it through an output gating function (318) into an output data stream at times and at rates also synchronized with the processors' operating rates.

36 Claims, 13 Drawing Sheets

U.S. PATENT DOCUMENTS

| | | | |
|---|---|---|---|
| 4,843,540 | 6/1989 | Stolfo | 395/650 |
| 4,852,001 | 7/1989 | Tsuhima et al. | 364/401 |
| 4,855,903 | 8/1989 | Carleton et al. | 395/325 |
| 4,860,201 | 8/1989 | Stolfo et al. | 395/800 |
| 4,866,664 | 9/1989 | Burkhardt, Jr. et al. | 395/200 |
| 4,891,787 | 1/1990 | Gifford | 395/375 |
| 4,954,948 | 9/1990 | Hira et al. | 395/650 |
| 4,979,097 | 12/1990 | Triolo et al. | 395/325 |
| 5,015,884 | 5/1991 | Agrawal et al. | 340/825.83 |
| 5,031,089 | 7/1991 | Liu et al. | 395/725 |
| 5,130,984 | 7/1992 | Cisneros | 370/94.1 |
| 5,142,470 | 8/1992 | Bristow et al. | 364/184 |
| 5,146,540 | 9/1992 | Natarajan | 395/11 |
| 5,151,623 | 9/1992 | Agrawal | 307/465 |
| 5,179,687 | 1/1993 | Iyer | 395/275 |

OTHER PUBLICATIONS

K. Deguchi et al., Integrated Parallel Image Processings on a Pipelined MIMD Multi–Processor System PSM, 10th International Conference on Pattern Recognition, Jun. 16, 1990, pp. 442–444.

Bishop et al., "Controlled Dynamic Load Balancing for a Multiprocessor System", U.S. application Serial No. 07/545,679, filed Jun. 28, 1990 which is a continuation of U.S. Serial No. 06/941,701, filed Dec. 22, 1986, now abandoned.

H. S. Stone, Introduction to Computer Architecture, Science Research Associates, Chicago, Ill., 1980, pp. 363–368.

J. P. Hayes, *Computer Architecture and Organization*, McGraw Hill Book Co., N.Y., 1988, pp. 209–227.

W. Stalling, *Computer Organization and Architecture*, MacMillan Pub. Co., N.Y., 1987, pp. 401–418.

H. S. Stone, *High Performance Computer Architecture*, Addison–Wesley Pub. Co., Reading, Mass., 1987, pp. 127–171.

M. M. Mano, *Computer Engineering Hardware Design*, Prentice–Hall, Englewood Cliffs, N.J., 1988, pp. 296–329.

FIG. 3

| | SLOW PROCESSOR (P) 11 | FAST PROCESSOR (P) 12 | | | |
|---|---|---|---|---|---|
| INPUT BUFFER (I.B.) | | | | | |
| DURATION | 0 | 0 | $\frac{1}{3}t$ | $\frac{2}{3}t$ | |
| INSTANTS | 0..0 | t..t | $2t .. 2\frac{1}{3}t$ | $3t .. 3\frac{2}{3}t$ | |
| PROCESSOR (P) | | | | | |
| DURATION | 4t | $1\frac{1}{3}t$ | $1\frac{1}{3}t$ | $1\frac{1}{3}t$ | |
| INSTANTS | 0 .. 4t | $t .. 2\frac{1}{3}t$ | $2\frac{1}{3}t .. 3\frac{2}{3}t$ | $3\frac{2}{3}t .. T+t$ | |
| OUTPUT BUFFER (O.B.) | | | | | |
| DURATION | 0 | $2\frac{2}{3}t$ | $2\frac{1}{3}t$ | 2t | |
| INSTANTS | 4t..4t (T..T) | $2\frac{1}{3} .. T+2t$ | $3\frac{2}{3}t .. T+2t$ | $T+t .. T+3t$ | |
| FRAME (F)$_i$ | $D_0$ | $D_1$ | $D_2$ | $D_3$ | |
| F(i+1) | $D'_0$ | $D'_1$ | $D'_2$ | $D'_3$ | |
| F(i+2) | $D''_0$ | $D''_1$ | $D''_2$ | $D''_3$ | |
| ⋮ | ⋮ | ⋮ | ⋮ | ⋮ | |

REPEAT FRAME SIZE 4D: $D_0, D_1, D_2, D_3; D'_0, D'_1, D'_2, D'_3; ...$
REPEAT FRAME TIME = 4t = T
SYSTEM THROUGHPUT = 1D PER t
SLOW PROCESSOR CLOCK TIME = 3t
FAST PROCESSOR CLOCK TIME = $1\frac{1}{3}t = \frac{4}{3}t$
DUTY CYCLE OF $P_{11}$ OR $P_{12}$ = 100%
SYSTEM DELAY = 4t

FIG. 6

| | SLOW PROCESSOR (P) 111 | INTERMEDIATE PROCESSOR (P) 112 | | FAST PROCESSOR (P) 113 | | | |
|---|---|---|---|---|---|---|---|
| INPUT BUFFER (I.B.) | | | | | | | |
| DURATION | 0 | 0 | $2t$ | $4t$ | 0 | $\frac{4}{5}t$ | $1\frac{3}{5}t$ | $2\frac{2}{5}t$ | $3\frac{1}{5}t$ |
| INSTANTS | $0..9t$ | $t..t$ | $2t..4t$ | $3t..7t$ | $4t..4t$ | $5t.5..5\frac{4}{5}t$ | $6t..7\frac{3}{5}t$ | $7t..\frac{2}{5}t$ | $8t..[T+2\frac{1}{5}]$ |
| PROCESSOR (P) | | | | | | | | |
| DURATION | $9t$ | $3t$ | $3t$ | $3t$ | $\frac{4}{5}t$ | $\frac{4}{5}t$ | $\frac{4}{5}t$ | $\frac{4}{5}t$ |
| INSTANTS | $0..9t$ | $t..4t$ | $4t..7t$ | $7t..T+t$ | $4t.5..\frac{4}{5}t$ | $5\frac{4}{5}t..7\frac{3}{5}t$ | $7\frac{3}{5}t..\frac{2}{5}t$ | $[T+\frac{2}{5}t]..[T+2\frac{1}{5}t]$ | $[T+2\frac{1}{5}t]..(T+4t)$ |
| OUTPUT BUFFER (O.B.) | | | | | | | | |
| DURATION | 0 | $6t$ | $4t$ | $2t$ | $7\frac{1}{3}t$ | $6\frac{2}{5}t$ | $5\frac{3}{5}t$ | $4\frac{4}{5}t$ | $4t$ |
| INSTANTS | $9t..9t$ (T..T) | $4t..(T+t)$ | $7t..(T+2t)$ | $(T+t)..(T+3t)$ | $7\frac{1}{5}t..(T+4t)$ | $7\frac{3}{5}t..(T+5t)$ | $[T+\frac{2}{5}t]..(T+6t)$ | $[T+2\frac{1}{5}t]..(T+7t)$ | $(T+4t)..(T+8t)$ |
| FRAME (F)$_i$ | $D_0$ | $D_1$ | $D_2$ | $D_3$ | $D_4$ | $D_5$ | $D_6$ | $D_7$ | $D_8$ |
| F(i+1) | $D_0'$ | $D_1'$ | $D_2'$ | $D_3'$ | $D_4'$ | $D_5'$ | $D_6'$ | $D_7'$ | $D_8'$ |
| F(i+2) | $D_0''$ | $D_1''$ | $D_2''$ | $D_3''$ | $D_4''$ | $D_5''$ | $D_6''$ | $D_7''$ | $D_8''$ |

REPEAT FRAME SIZE = 9D; (D$_0$....D$_8$); (D$_0'$...D$_8'$); ...

REPEAT CYCLE TIME = 9t = T

SYSTEM THROUGHPUT = 1 BLOCK PER t SECONDS

SLOW PROCESSOR CLOCK = 9t

INTERMEDIATE PROCESSOR CLOCK = 3t

FAST PROCESSOR CLOCK = $\frac{9}{5}t$ = 1.8t

DUTY CYCLE OF P$_{111}$, P$_{112}$ OR P$_{113}$ = 100%

SYSTEM DELAY = 9t

FIG. 9

|  | SLOW PROCESSOR (P) 112 | | | FAST PROCESSOR (P) 113 | | | | |
|---|---|---|---|---|---|---|---|---|
|  | $D_0$ | $D_1$ | $D_2$ | $D_3$ | $D_4$ | $D_5$ | $D_7$ | $D_8$ |
| INPUT BUFFER (I.B.) | | | | | | | | |
| DURATION | 0 | $1\frac{2}{3}t$ | $3\frac{1}{3}t$ |  | $\frac{3}{5}t$ | $1\frac{1}{5}t$ | $1\frac{4}{5}t$ | $3\frac{1}{5}t$ |
| INSTANTS | $0...0$ | $t..2\frac{2}{3}t$ | $2t..5\frac{1}{3}t$ | $3t..3t$ | $4t..4\frac{3}{5}t$ | $5t..6\frac{1}{5}t$ | $6t..7\frac{4}{5}t$ | $7t..(T+1)$ |
| PROCESSOR (P) | | | | | | | | |
| DURATION | $2\frac{2}{3}t$ | $2\frac{2}{3}t$ | $2\frac{2}{3}t$ | $1\frac{3}{5}t$ | $1\frac{3}{5}t$ | $1\frac{3}{5}t$ | $1\frac{3}{5}t$ | $1\frac{3}{5}t$ |
| INSTANTS | $0..2\frac{2}{3}t$ | $2\frac{2}{3}t..5\frac{1}{3}t$ | $5\frac{1}{3}t..T$ | $3t..4\frac{3}{5}t$ | $4\frac{3}{5}t..6\frac{1}{5}t$ | $6\frac{1}{5}t..7\frac{4}{5}t$ | $7\frac{4}{5}t..[T+\frac{2}{5}t]$ | $9\frac{2}{5}t..(T+3t)$ |
| OUTPUT BUFFER (O.B.) | | | | | | | | |
| DURATION | $3\frac{1}{3}t$ | $1\frac{2}{3}t$ | 0 | $4\frac{2}{5}t$ | $3\frac{4}{5}t$ | $3\frac{1}{5}t$ | $2\frac{3}{5}t$ | $2t$ |
| INSTANTS | $2\frac{2}{3}t..6t$ | $5\frac{1}{3}t..7t$ | $T..T$ | $4\frac{3}{5}t..\left[T+\frac{1}{5}t\right]$ | $(6\frac{1}{5}t)..(T+2t)$ | $\left[7\frac{1}{5}t\right]..(T+3t)$ | $\left[T+1\frac{2}{5}t\right]..(T+4t)$ | $(T+3t)..(T+5t)$ |
| FRAME $(F)_i$ | | | | | | | | |
| ARRIVAL TIME = 0 | $D_0$ | $D_1$ | $D_2$ | $D_3$ | $D_4$ | $D_5$ | $D_6$ | $D_7$ |
| $F_{(i+1)}$ ARR. TIME T | $D'_0$ | $D'_1$ | $D'_2$ | $D'_3$ | $D'_4$ | $D'_5$ | $D'_6$ | $D'_7$ |
| $F_{(i+2)}$ ARR. TIME = 2T | $D''_0$ | $D''_1$ | $D''_2$ | $D''_3$ | $D''_4$ | $D''_5$ | $D''_6$ | $D''_7$ |

REPEAT FRAME SIZE = $8D$; $(D_0...D_7)$; $(D'_0...D'_7)$; ...
REPEAT CYCLE TIME = $8t = T$
SYSTEM THROUGHPUT = 1 BLOCK PER $t$ SECONDS
FAST PROCESSOR CLOCK = $1\frac{3}{5}t = \frac{8t}{5}$ SLOW PROCESSOR CLOCK = $\frac{8t}{3}$
DUTY CYCLE OF $P_{112}$ OR $P_{113}$ = 100%
SYSTEM DELAY = $6t$

FIG. 11

| PROCESSOR # | # OF BLOCKS PROCESSED | RATE | PROCESSED DATA BLOCK #'s | PROCESSING TIME FOR EACH PROCESSOR |
|---|---|---|---|---|
| $P_1$ | $a_1$ | $T/a_1$ | $0..(a_1-1)$ | $T$ |
| $P_2$ | $a_2$ | $T/a_2$ | $\sum_{j=1}^{1} a_j..(\sum_{j=1}^{2} a_j -1)$ | $T$ |
| $P_3$ | $a_3$ | $T/a_3$ | $\sum_{j=1}^{2} a_j..(\sum_{j=1}^{3} a_j -1)$ | $T$ |
| ⋮ | ⋮ | ⋮ | ⋮ | $T$ |
| | | | | $T$ |
| | | | | $T$ |
| $P_i$ | $a_i$ | $T/a_i$ | $\sum_{j=1}^{i-1} a_j..(\sum_{j=1}^{i} a_j -1)$ | $T$ |
| $P_k$ | $a_k$ | $T/a_k$ | $\sum_{j=1}^{k-1} a_j..(\sum_{j=1}^{k} a_j -1)$ | $T$ |

FIG. 12

| BLOCK # | m | m+1 | m+2 | ... | m+($a_i$-1) |
|---|---|---|---|---|---|
| INPUT BUFFER (I.B.) | | | | | |
| DURATION | 0 | $\left[\frac{N}{a_i}-1\right]t$ | $2\left[\frac{N}{a_i}-1\right]t$ | ... | $(a_i-1)\left[\frac{N}{a_i}-1\right]t$ |
| INSTANTS | mt..mt | $(m+t)t..\left[m+\frac{N}{a_i}t\right]$ | $(m+2)t..\left[m+\frac{N}{a_i}\right]t$ | ... | $m+(a_i-1)t..\left[m.N\left[\frac{a_i-1}{a_i}\right]\right]t$ |
| PROCESSOR (P) | | | | | |
| DURATION | $\frac{N}{a_i}t$ | $\frac{N}{a_i}t$ | $\frac{N}{a_i}t$ | ... | $\frac{N}{a_i}t$ |
| INSTANTS | $mt..\left[m+\frac{N}{a_i}\right]t$ | $\left[m+\frac{N}{a_i}\right]t..\left[m+\frac{2N}{a_i}\right]t$ | $\left[m+\frac{2N}{a_i}\right]t..\left[m+\frac{3N}{a_i}\right]t$ | ... | $\left[m+\frac{(a_i-1)}{a_i}N\right]t..(m+N)t$ |
| OUTPUT BUFFER (O.B.) | | | | | |
| DURATION | $D-\frac{N}{a_i}t$ | $\left[\left[D+t-\frac{2Nt}{a_i}\right]\right]$ | $\left[\left[D+2t-\frac{3Nt}{a_i}\right]\right]$ | ... | $\left[D+(a_i-1)t-\frac{a_i}{a_i}Nt\right]$ |
| INSTANTS | $\left[m+\frac{N}{a_i}\right]t..(D+(mt))$ | $\left[m+\frac{2N}{a_i}\right]t..(D+(m+1)t)$ | $\left[m+\frac{3N}{a_i}\right]t..(D+(m+2)t)$ | ... | $(mt+D)t..(D+mt+(a_i-1)t)$ |

NOTE: BLOCKS FLOWING THROUGH A PROCESSOR I CONSIST OF $a_i$ DATA BLOCKS FROM BLOCK $m = \sum_{1}^{i-1} a_j$ TO BLOCK $(m+a_i-1)$ $$N = \sum_{i=1}^{i=k} a_i \qquad D = T-(a_1-1)\cdot t \text{ AND } Nt=T$$

SYNCHRONOUS MULTIPROCESSOR USING TASKS DIRECTLY PROPORTIONAL IN SIZE TO THE INDIVIDUAL PROCESSORS RATES

TECHNICAL FIELD

This invention relates to the architecture of multiprocessor computers.

BACKGROUND OF THE INVENTION

Broadly, a multiprocessor computer, or multiprocessor for short, is a computer system comprising a plurality of processors that cooperate in the performance of system tasks. Conventional multiprocessor architectures are of two types: synchronous and asynchronous. Generally, "synchronous" refers to a device whose speed of operation is related to the rest of the system to which the device is connected. As used in the art and herein, "synchronous" computer refers to a computer in which each event, or the performance of each operation, that is of interest starts as a result of a signal generated by a clock. Conversely, "asynchronous" refers to a device or a computer that is not synchronous.

In an asynchronous multiprocessor, the individual processors operate under their own timing and at their own rate. Consequently, processors of different types or having different performance characteristics may be used in such a system. The time of completion by an individual processor of its portion of the system task is uncertain; hence, the processors use inter-processor messages or interrupts to notify system control of their task-portion completion and readiness to undertake another task portion. The system control may be centralized, e. g., a host processor, or decentralized and distributed among the individual processors. In either case, however, the system control typically must be an intelligent entity, capable of awaiting message or interrupt arrival, of responding to arrival of different messages or interrupts in different order and at different times, and of controlling system activity accordingly. This means that the system control typically must be rather complex, and hence expensive. Furthermore, the generation and transmission of, and awaiting of responses to, messages and interrupts by processors is wasteful of time, i.e., constitutes overhead, and adversely affects system performance. Examples of asynchronous systems are processor arrangements in distributed computer systems and area networks of computers.

In a synchronous multiprocessor, the individual processors operate either under common central timing, or their individual timing mechanisms are synchronized with each other. The time of completion by an individual processor of its portion of the system task is deterministic and knowable in advance; hence, the use of messages and interrupts is not required to notify system control of when individual processors become available. In fact, no notification is needed, and system control may be reduced to a simple input and output gating function, driven by the same timing mechanism as drives the processors. This eliminates much of the complexity and expense of system control mechanisms and the overhead associated with control communication mechanisms of asynchronous systems. These advantages have in the past had a price, however: to enable operating a plurality of processors synchronously, the prior art has relied on either using identical processors—ones having identical performance characteristics—or on operating a plurality of non-identical processors at the performance, e.g., speed, of the lowest-performance one of the processors. This need to use matching processors, or to at least equalize their individual performances, has typically resulted in high system cost, and has bred inefficiencies of its own. Examples of synchronous systems are array processors and super-computers such as the Cray computer.

SUMMARY OF THE INVENTION

This invention is directed to solving these and other disadvantages of the prior art. Broadly according to the invention, there is presented a multiprocessor architecture wherein processors having different performance characteristics are used and operated each at its own speed, as in asynchronous systems, yet the processors are operated in synchronism as in synchronous systems, to avoid the disadvantages and to gain the advantages of both asynchronous and synchronous systems in one multiprocessor. Specifically according to the invention, a multiprocessor system is made up of a plurality of processors operating in parallel and synchronously with each other, but at least some of the processors each operate (i.e., process tasks, such as data) at a different rate, so that each processor processes a task unit (such as unit of data) in a different amount of time than the other processors. Portions of a received task are distributed to the individual processors in portions (e.g., input data amounts) that are directly proportional in size to the processor operating rates. As a result, the various processors process their respective tasks in the same amount of time. The results of each processors' processing are then output—illustratively, although not necessarily, by being combined together.

As illustrative embodiment of the system includes first means connected to the plurality of processors, that receive a task (such as a first, input, stream of data) and distribute portions of the received task to individual ones of the processors for processing. The distribution is made in portions (e.g., input data amounts) that are directly proportional in size to the operating rates of the individual processors, so that each individual processor processes the portion of the task that is distributed to the individual processor in the same amount of time as the other processors process the portions that are distributed to them. The system further includes second means, connected to the plurality of processors, which output the results of the processing. The second means illustratively receive from the processors the results of the processing (e.g., the processed data) and combine the results which have been received from the plurality of processors into a common output (such as a second, output, stream of data). The single input and output streams ensure that the multiprocessor interacts with the outside world as would a uniprocessor, and hence allows for easy substitution of the multiprocessor for even a uniprocessor having an equal performance capability but, almost invariably, also having a higher price.

Further illustratively, the multiprocessor system also includes synchronous input and output buffering means. The input buffering means are connected to the first means and to some or all of the processors (depending upon the particular multiprocessor's configuration), and operate synchronously with the connected processors. The input buffering means receive and store the task portions distributed by the first means to the connected processors, and input the stored task portions to the connected processors at rates that are synchronized with the operating rates of the connected processors. The output buffering means are connected to the same processors and to the second means, and operate synchronously with the plurality of the processors. The output buffering means store the results of processing by the connected processors, and output the stored results to the second means at times and at rates synchronized with the operating rates of the plurality of processors.

Operating as a synchronous system, the multiprocessor characterized above avoids the disadvantages of asynchronous systems: control (e.g., task distribution) arrangements that are complex, intelligent, and hence expensive, latency-introducing processor-to-control communication schemes, and the consequent high cost and lower efficiency of operation. Yet, by operating the processors each at its own rate and hence being able to operate each processor at its maximum rate, the multiprocessor avoids the disadvantages of conventional synchronous systems: either the high cost of having to operate with specially-selected matched processors that all operate at the same maximum speed, or the low-performance bottleneck of operating all processors at only their highest common speed. Rather, this synchronous multiprocessor also has the advantages that are typically associated only with asynchronous systems: being able to operate each processor at its own maximum rate, and reduced system cost on account of being able to mix and match processors of different speeds.

In a preferred embodiment, the task which is a first stream of data comprises a sequence of input data frames each including an identical amount of data. The first means distribute a different amount of data from each input frame to each of the processors for processing. The amounts distributed to different processors from each first frame are in the same proportion as the operating rates of the processors. The second means combine the processed data received from the processors into a sequence of output data frames each also including an identical amount of data. Each output frame includes a different amount of processed data received from each of the processors. The amounts included in each second frame from different processors are in the same proportion as the operating rates of the processors. In such an arrangement, all processors may advantageously be occupied with data processing 100 percent of the time, for maximum system efficiency.

The multiprocessor system characterized above is advantageously employed in a pipelined system having a plurality of cascaded processing stages each operating to process data at the same rate, so that each stage processes a unit of data in a same period of time as the other stages, and all operating synchronously with each other. The multiprocessor system forms one of the stages, and a plurality of the multiprocessor systems may be used to form a plurality of the stages. This arrangement allows the construction of very high-speed pipelined processors without the need to construct them from very high-cost high-speed uniprocessor stages.

The invention further encompasses a method of operating a multiprocessor system comprising a plurality of processors operating in parallel and synchronously with each other, each operating to process tasks at a different rate. Generally according to the method, a task (such as a first, input, stream of data) is received and is distributed to individual ones of the processors for processing. The distribution is made in portions (e.g., amounts of the data) that are directly proportional in size to the operating rates of the individual processors. The distributed task portions received at each processor are then processed by the processor at the rate of the receiving processor, so that each individual processor processes a unit of the distributed task in a different amount of time than, but processes all of the portion of the task that is distributed to the individual processor in the same amount of time as, the other processors process the portions that are distributed to them. The results of the processing are then output. Illustratively, the processing results (e.g., the processed data) are received from the plurality of processors and are combined into a common output (such as an output data stream). This mode of multiprocessor operation results in the multiprocessor configuration characterized previously, with all of its attendant advantages. These and other advantages and features of the invention will become apparent from the following description of an illustrative embodiment of the invention considered together with the drawing.

BRIEF DESCRIPTION OF THE DRAWING

FIG. 3 is a table of timing relations of constituent elements of the multiprocessor of FIG. 1:

FIG. 6 is a table of timing relations of constituent elements of the multiprocessor of FIG. 4;

FIG. 9 is a table of timing relations of constituent elements of the multiprocessor of FIG. 7;

FIG. 11 is a table showing the processing times and data processed by individual processors of the multiprocessor of FIG. 10;

FIG. 12 is a table of timing relations of constituent elements of the multiprocessor of FIG. 10;

DETAILED DESCRIPTION OF ILLUSTRATIVE EMBODIMENTS

I. INTRODUCTION

Figure 1:
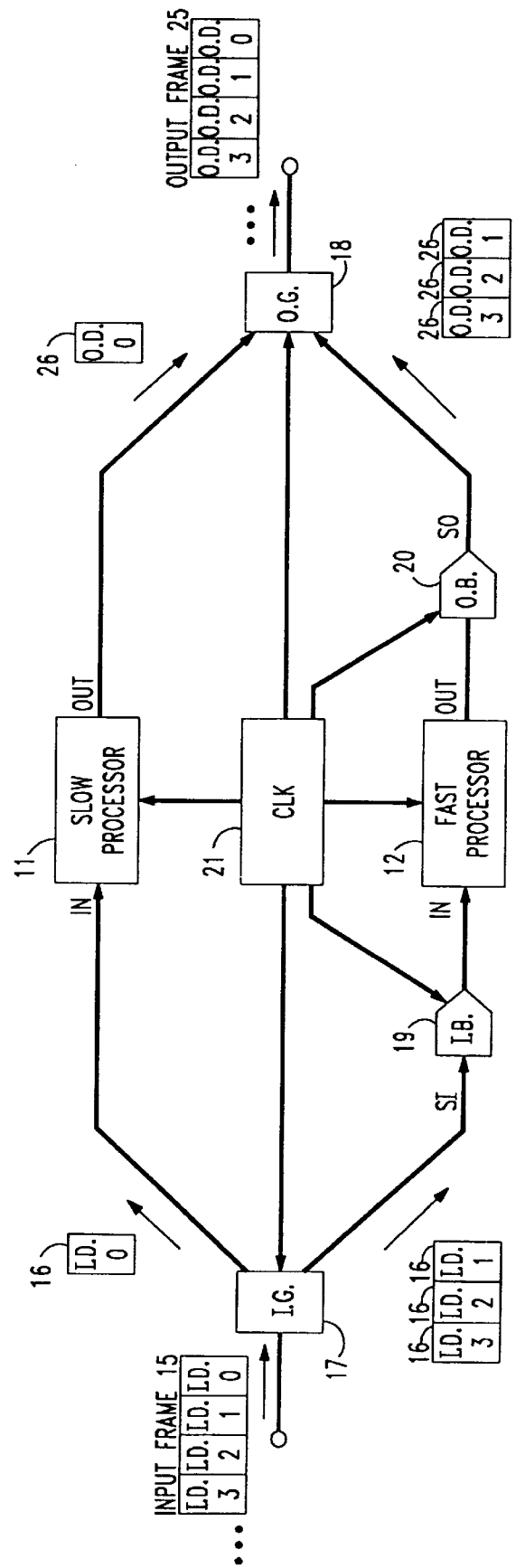
FIG. 1 is a block diagram of a multiprocessor embodying a first illustrative example of the invention.

Processors of different functional attributes have to coexist in many computing systems. In fact, the functionality can be disintegrated into finer and finer modular blocks, thus leading to more and more specialized processors. At one extreme of granularity lie entire macroscopic computer systems, and at the other extreme of microscopic size exist the single-chip digital processors or even the reduced-instruction-set computers. Considerable architectural commonality prevails between the processors that perform a diversity of functions, in spite of their physical size or even geographical expanse. In this discussion, we utilize the architectural similarity with complete consideration of the functional disparity of these processors. We suggest an integrated architecture that spatially separates the processors that accomplish different sub-functions, but sequentially chains these sub-functions in the time domain to perform the composite function of the entire system.

The problem is specially relevant in microcomputers, where one CPU can operate at, e.g., 4.77 MHz, and another functionally-similar CPU can operate at, e.g., 35 MHz.

Other single-board microcomputers, with multiple processors to handle multiple users, are also emerging. The architecture suggested here unifies these processors to obtain a throughput through the system which is greater than the fastest-rate processor, by letting each processor function at its own maximum rate.

II. COMMON ARCHITECTURAL FEATURES

Generally, computer systems have memories, processors, and input/output arrangements. To facilitate communication between these three major modules, different bus arrangements are used.

2.1 Memories and Their Generalizations

Memories may become extended into separate devices, or they may become few-word cache memories with rapid access to the processors. They may even assume the form of registers that hold transitory information output from, or for input to, the processors. In a general functional framework, they hold information (program and/or data) to facilitate execution by the processor of binary instructions after compilation of the program. In a traditional sense, active memories hold data and programs, tasks, or procedures, which the processor accesses and executes to generate processed data from raw data.

In the context of this discussion, we extend the concept of a memory to encompass any storage device (from mass storage media to integrated registers that may hold a single byte of data for the processor to use in execution of its task. We also assume that the transition of information from these memories is a time-intensive process. The time to fill the memories with raw data, and to remove the processed data from the memories after due processing by the processor, becomes a chain with the processing time, in order to derive optimal architectures of the computing systems or processors. We assume data to arrive uniformly (for limited/extended periods of time) to be processed in the proposed structures. The data arrives and departs from the proposed structures uniformly, and there is no need for extended buffering of data.

2.2 Processors and Their Generalizations

Processors have data units and control units. The instructions which contain the operation code (opcode) and data (or its address) can be executed by hardwired logic or by micro-code residing in control memories. In a general sense, the sequence of events within the processor has been traditionally considered as: fetch the instruction, decode the opcode, access the operands (depending upon the type of instruction), execute the instruction, and put away the result for future reference.

In the context of this discussion, we extend the concept of a processor to include any information-processing entity (from massive mainframes to a single chip or its fraction). Input to the processors may come from memories of any size, shape, or form. Output of the processors may be depleted to memories of any size, shape, or form. We assume that the execution of a process is time-intensive, and we chain the processing times sequentially such that an entire process may be completed. The sequence of events in the completion occurs in the following three steps: fetching the program unit, executing it, and storing away the result. This task can become as simple as the execution of a single instruction in the CPU, or it can become as complex as tracking the activity of the stock market over decades. Processing time can thus be integrated with the duration of memory functions, and the time for the entire task is considered for maximum throughput.

The processor clock rate will be understood to refer to the rate of processing of a unit of data (of any selected size—bit, byte, word, block, etc.) through the processor, and not the internal logic clock rate at which individual logic elements/gates change their state, or the rate of performing a single instruction. For example, assume a microprocessor having an internal logic clock rate of 32 MHz—commonly referred to as a 32 MHz microprocessor—and that takes 2000 instructions to process a unit of data. Then the microprocessor's clock rate, for purposes of this discussion, is 16 KHz.

2.3 Input/Output Handling

Conventionally, I/O handlers communicate with an environment that may include devices, secondary storage systems, outside sources and sinks of information, networks, etc. When these functions are complex, special I/O processors are dedicated to handle multiple tasks and devices in the mainframe environment.

In the context of this discussion, the I/O functions deserve special consideration. In a microscopic environment, I/O refers to bringing the information from main memory, or even cache, to the registers such that the data (and opcode) are available at the processor. In a macroscopic environment, I/O functions may imply scanning of satellite data from global networks, or even receiving data from space probes. Since the definitions of memories in section 2.1 is global, I/O handling becomes embedded in filling of the input memories (or even registers) with raw data and depleting the processed data from output memories (or even registers).

2.4 Bus Structures

Conventionally, buses play an important role in inter-module communications. Architectures using a single bus for all communications tend to become slow due to traffic congestion on this single data path. Dual buses, one for slow peripherals and another for fast peripherals, do not have special significance in the context of this discussion. However, dual memory-bus architectures (one for input and the other for output) become necessary for synchronizing of the I/O functions from the processors with the I/O functions to the memories.

III. MODULAR BLOCKS IN THE SUGGESTED ARCHITECTURE

Processors with finite execution times, memories with finite shift-in/shift-out (SI/SO) times, and two buses (one for SI and the other for SO) become the basic building blocks. Data (or programs) may arrive from the memory, get processed, and leave the configuration to the memory. Data may arrive sequentially or in parallel, depending upon the amount and rate of arrival. The object is to have the data stream(s) ready for processing when the processor becomes ready to access the input data. Data may leave sequentially or in parallel, depending upon the amount and rate of departure. The object is to have the output memory available for the processor to dump the output when it has finished processing the input stream. These processes are all finite and time-intensive, as is the processing time. The architecture suggested here depends upon the synchronization and partitioning of the time such that (a) the fetching of input data into the input memories, (b) decoding plus executing of the process by the processors, and (c) storing of the results onto the output memories, (commonly known as the Fetch, Decode, Execute (FDE) and store cyclic functions of a typical processor), all form a finitely-clocked production-line facility. Under optimal conditions, and when the structures are properly designed, the processors will never be idle, but will continuously be processing data one data unit after another. In addition, processors of different capacities and clock rates may be freely mixed and operated at different clock rates that are an integral multiple of some common sub-rate.

In summary, the three essential blocks in the computational systems are:

(a) input memories with finite address locations, each to receive and hold the unprocessed data blocks from the input bus until the processor is ready for the block, (b) processors with finite execution times, even though their clock rates and their functional attributes may be different, and (c) output memories with finite address locations, each to receive the processed data blocks from the processor until the output bus is ready to receive and transmit the processed data.

IV. SIMD STRUCTURES WITH PROCESSORS OF DIFFERENT CLOCK RATES

Single-instruction, multiple-data (SIMD) processing arrangements are based upon unifying the control from a single instruction and channeling it to multiple arithmetic logic units handling different data streams. Conventionally, it is expected that these processors operate at the same rate, finish processing their respective input data streams concurrently, and become ready for the next instruction and next input data stream.

When the clock rates for these processors are different, the number of processors can be decreased by making the faster processors process more data units, or blocks, than the slower ones. Maintaining direct proportionality between the number of data blocks processed and the maximum processing speed can ensure consistent completion times. However, the SI/SO function of the registers, or the storage allocation and time of the memories, needs to be synchronized and overlapped if none of the processors are to remain idle. A full utilization of all the CPUs is thus ensured. The basic concept is presented in the body of this discussion with two processors where the clock rate of one is an integer multiple of the other, and it is generalized to multiple processors with fractional relationships between the clock rates.

4.1 Two-Rate Two-Processor Structures with Integer Relation Between Clocks

An example of this arrangement is shown in FIG. 1. In this simple situation, the relation between the size of a repetitive frame (F.) 15 of input data blocks (I.D.s) 16 and clock speed is evaluated. The delay through the arrangement becomes consistent with the processing time for the slower processor 11 to process a unit of data, the first data block 16. The faster processor 12 starts processing after the proportionate number of data blocks 16 have arrived to be processed by the slower processor 11. The entire process repeats indefinitely. The average throughput is shown in FIG. 3 to be equal the weighted average throughput of processors 11 and 12 and their relative processing rates. The input gating functions (I.G.) 17 and output gating function (O.G.) 18 also get simplified in this case.

Figure 2:
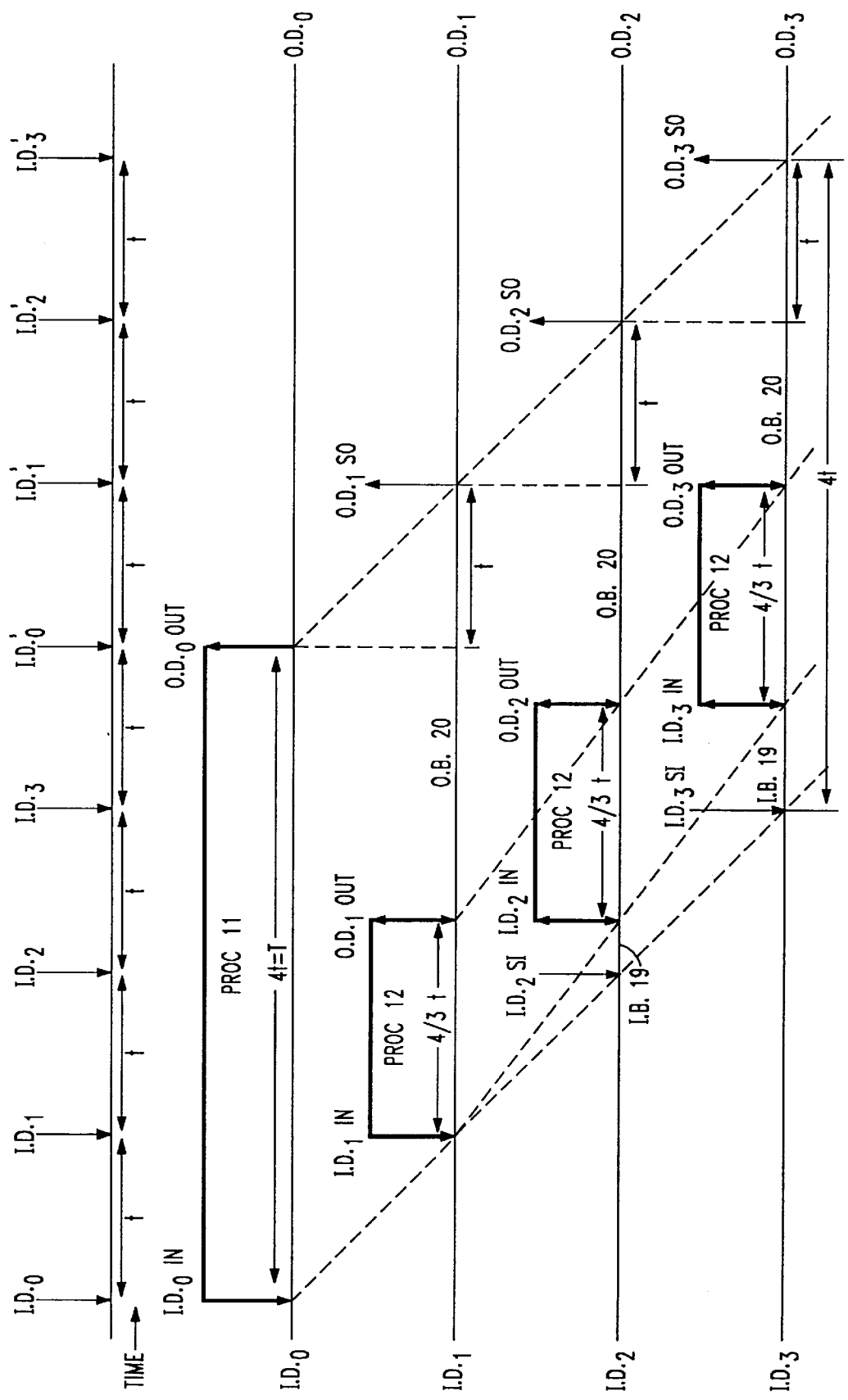
FIG. 2 is a timing diagram of operation of the multiprocessor of FIG. 1.

Consider the illustrative example of FIG. 1, where the faster processor 12 operates at three times the rate of the slower processor 11. The repetitive input frame 15 is four (=1+3) input data blocks 16 long, and is processed by a single instruction in the SIMD case. The timing diagram for the arrangement of FIG. 1 is shown in FIG. 2. The top time line in FIG. 2 shows the arrival times of data blocks 16. Each of the subsequent time lines shows the progression of individual data blocks 16 of a frame 15 through the arrangement of FIG. 1.

The gating function 17 that is applied to the input data blocks 16 follows a simple rule. The slower processor 11 receives the first block 16 and starts processing immediately. The faster processor 12 must wait for the second block 16 and starts processing immediately. The third and fourth blocks 16 are collected in input buffer (I.B.) 19 as they arrive, and processor 12 processes the blocks 16 one after another continuously. The end of the processing of the first block 16 coincides with the arrival of the first block 16 of the next repetitive input frame 15, while the end of processing of the fourth block 16 coincides with the arrival of the second block 16 of this next repetitive input frame 15. The processed first input block 16 forms the first output data block (O.D.) 26, and is gated out by gating function 18 immediately. The processed second, third, and fourth input blocks 16 form the second, third, and fourth output data blocks 26. These are collected by an output buffer (O.B.) 20, and are gated out in sequence immediately following the gating out of the first output block 26. An output frame (F.) 25 of processed input data blocks 16 is thus formed, which replicates input frame 15 in the ordering of processed input data blocks 16. All the gating and processing functions can be triggered by timing signals derived from a common clock (CLK.) 21 running at $t'=t/5$ rate, which rate is the least common multiple of all of the required clock rates. The required clock rates are derived by applying frequency dividers (e.g., counters) to the common clock 21 rate. The various gating and processing functions are thereby synchronized. In general, if the frame 15 size is n blocks 16, with n1 and n2 blocks being processed by the slower processor 11 and the faster processor 12, respectively, with the ratio between the processor rates being p, and if the arrival time between blocks 16 is t, then the relations presented in FIG. 3 ascertain that both processors 11 and 12 will never be idle.

Figure 4:
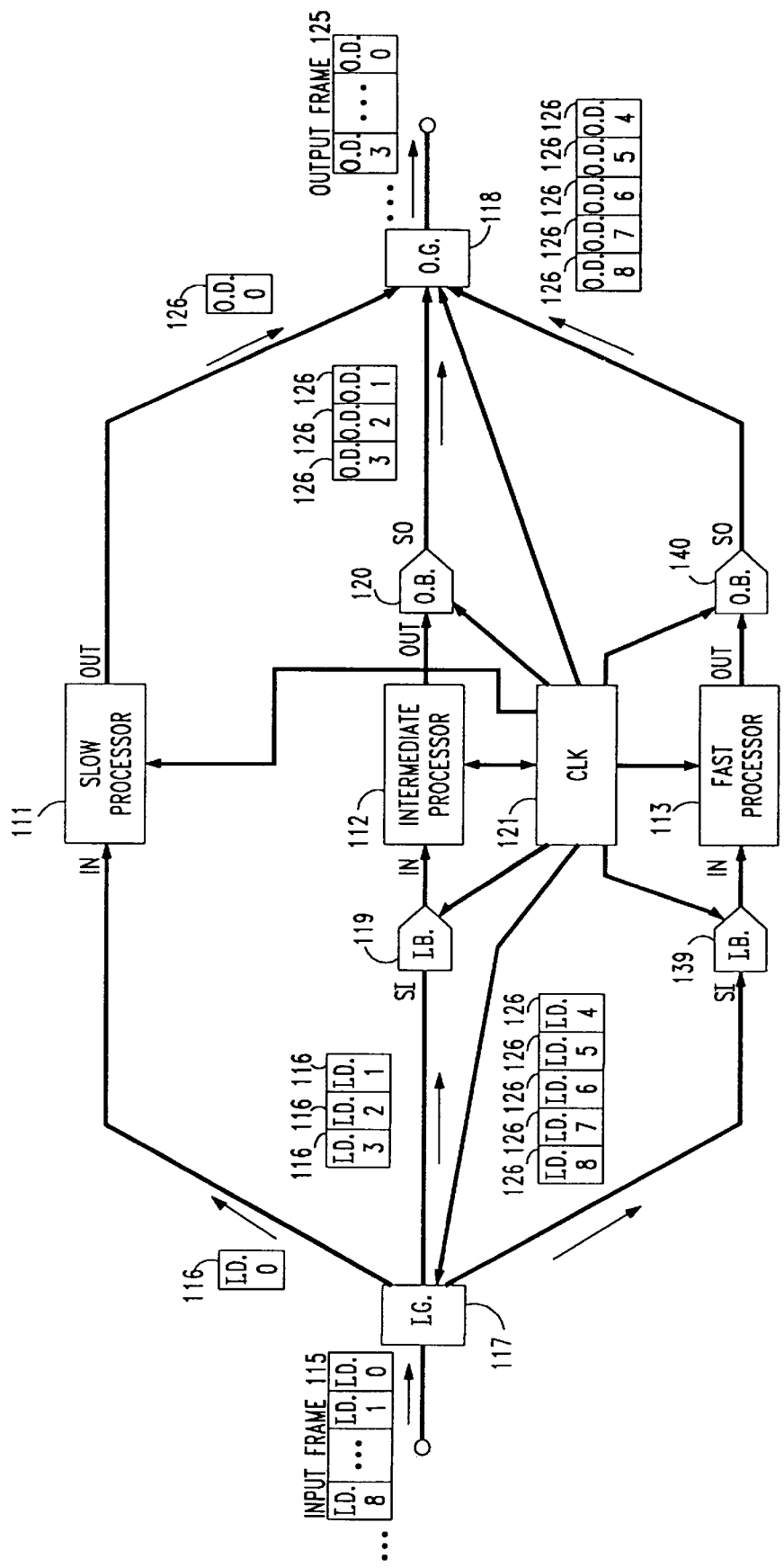
FIG. 4 is a block diagram of a multiprocessor embodying a second illustrative example of the invention.
Figure 5:
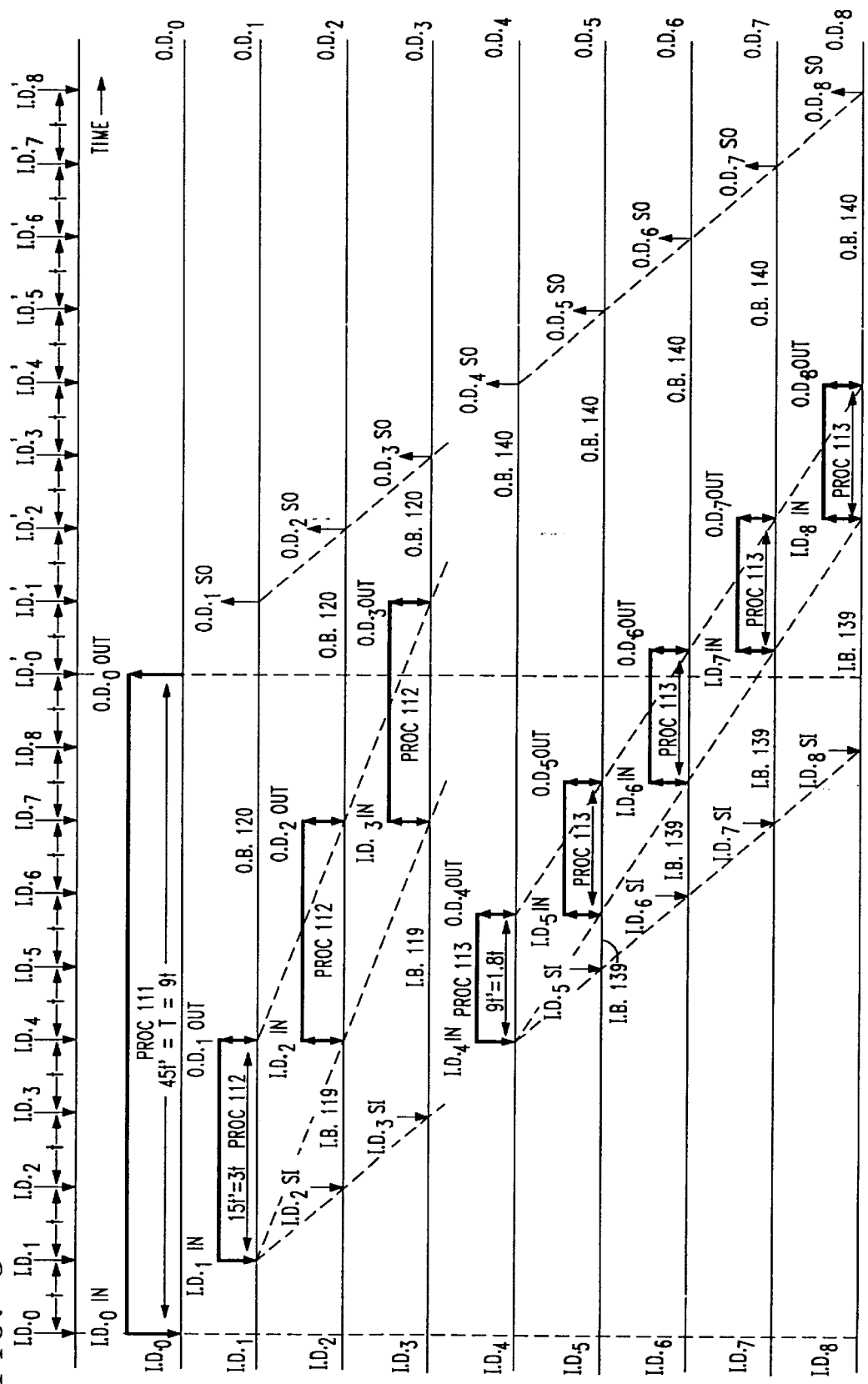
FIG. 5 is a timing diagram of operation of the multiprocessor of FIG. 4.

4.2 Multi-Rate Multiprocessor Structures with Integer Relation Between the CPU Rates The number of processors can be increased to any number m, provided that the number of blocks 16 processed by each processor is in direct proportion to its processing rate vis-a-vis the processing rates of the other processors. In this section, we present the case where there are three processors 111, 112, and 113, with 1:3:5 relation between their rates. This arrangement is shown in FIG. 4. The input frame 115 size is 9 (=1+3+5) blocks 116. The slowest processor 111 requires 9t seconds to process one data block 116, with t seconds being the inter-arrival time of each block 116. The second and third processors 112 and 113 require 3t and 1.8t, respectively, to process each data blocks 116. The throughput of the system is one block 116 per t seconds, being faster than the fastest processor 113 rate and equal to the inter-arrival time for each data block 116. Input blocks 116 are distributed to processors 111, 112, and 113 by an input gating function 117, and are processed to form corresponding output blocks 126 which are assembled at an output gating function 118 into an output frame 125 that duplicates input frame 115 in the ordering of processor input blocks 116. No memory is required in the system other than the temporary input and output storage buffers 119, 120, 139, and 140, whose operation is in synchronism with the process times. The processors 111, 112, and 113 are never idle and function synchronously. The timing diagram for the arrangement of FIG. 4 is shown in FIG. 5. The requisite relations that ascertain that all three processors 111, 112, and 113 will never be idle are presented in FIG. 6.

The gating functions 117 and 118 in this case are also simple, with the intermediate processor 112 processing three data blocks 116 starting from the second (2=1+1) block, and the fast processor 113 processing five data blocks 116 starting from the fifth (5=1+3+1) data block. All the gating and processing functions can be triggered by a common clock 121 running at t'=t/5 rate. The structure can be extended to m processors with any integer relation between the processor clock rates.

Figure 7:
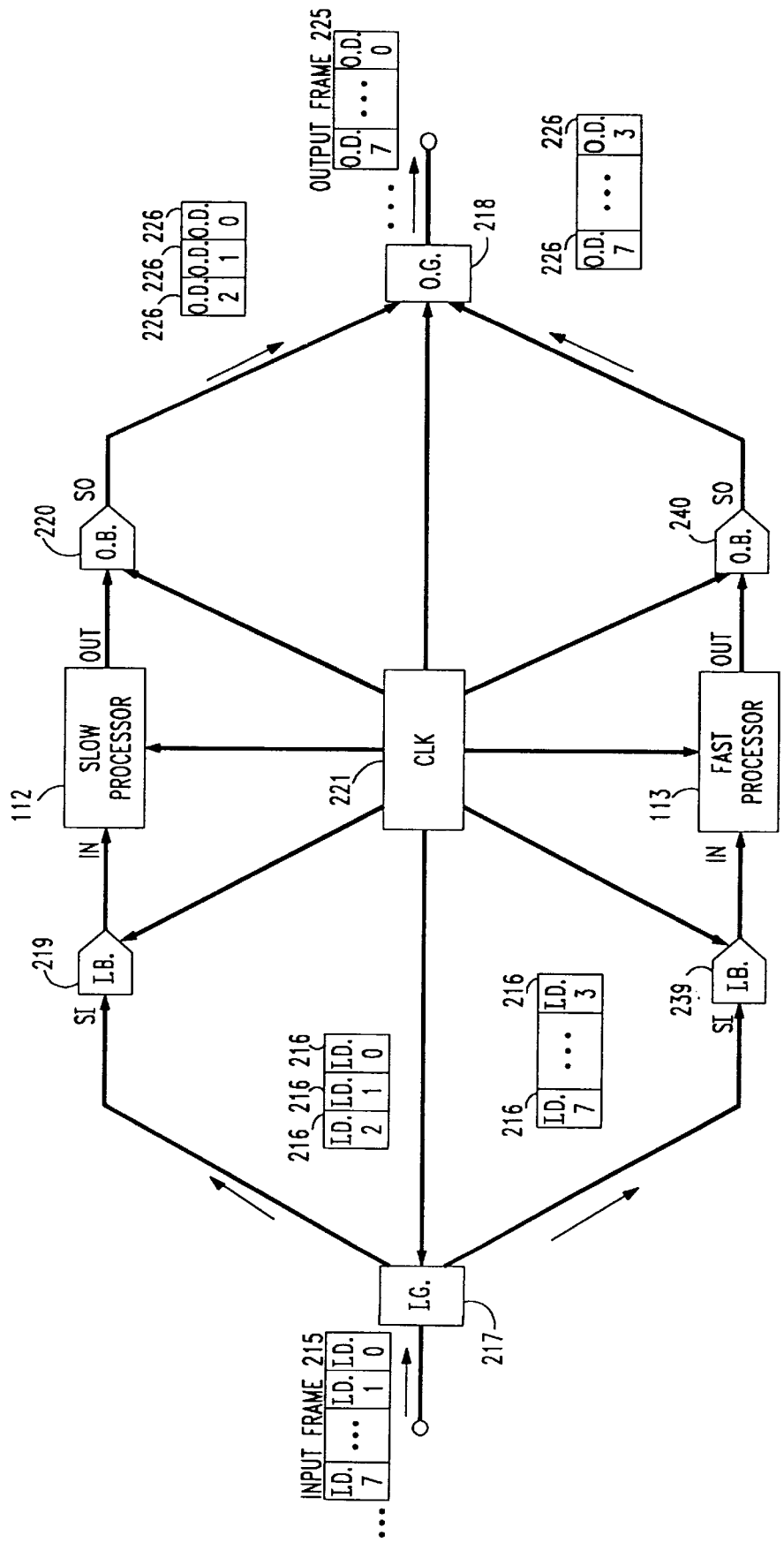
FIG. 7 is a block diagram of a multiprocessor embodying a third illustrative example of the invention.

4.3 Multiple-Rate Multiprocessor Structures with Fractional Relation Between the CPU Clocks It is interesting to note that any segment of the parallel arrangements shown in the earlier configurations can be dropped without any loss of generality. This leads to any generalized number of parallel processor paths and any relation between their rates. For example, if the slow processor 111 of FIG. 4 is dropped, the two processors 112 and 113 with a 3:5 proportioning between their rates will function properly if the number of input data blocks per input data frame is made eight instead of nine, as discussed next in this section. This configuration is shown in FIG. 7.

Figure 8:
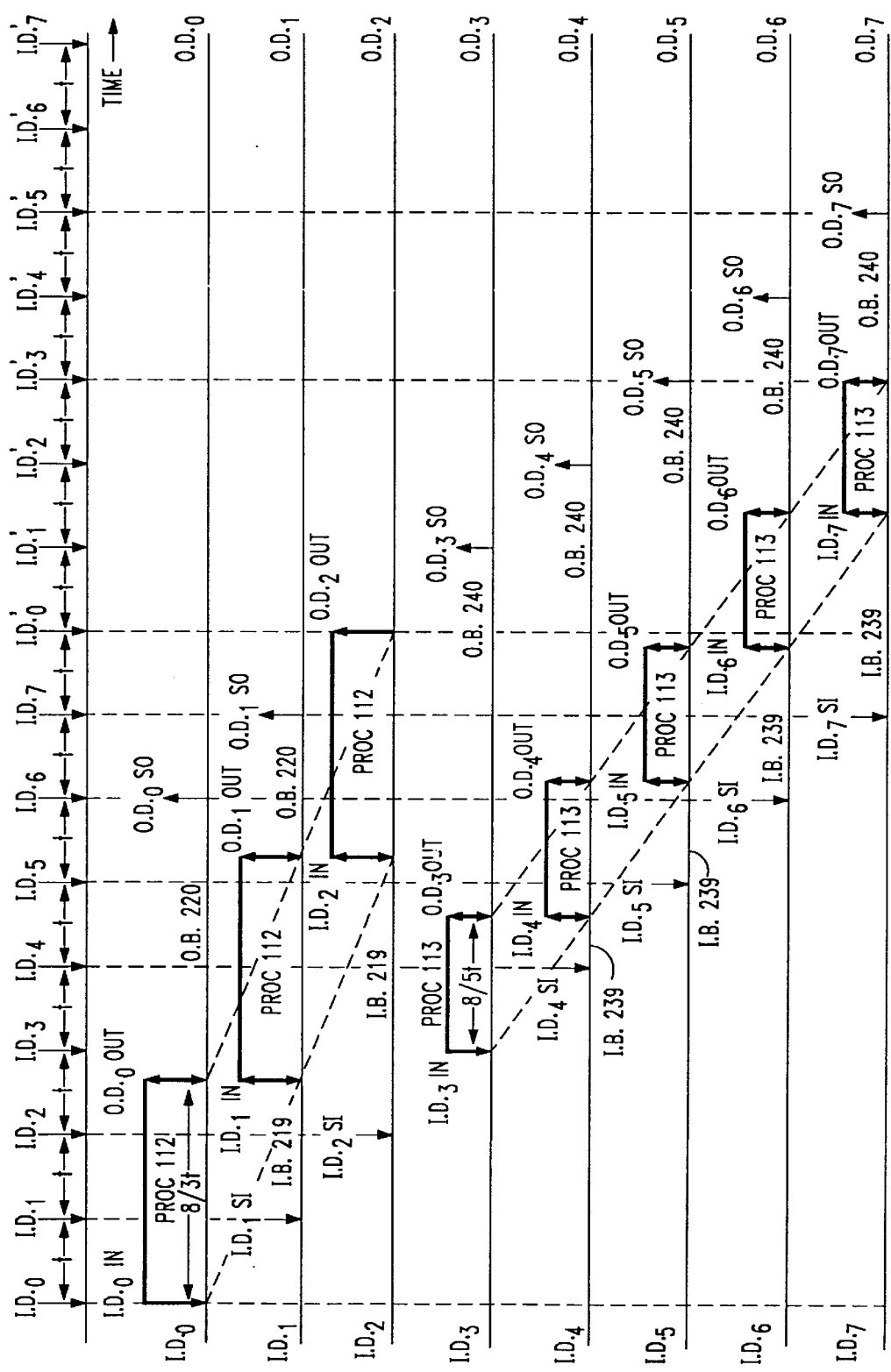
FIG. 8 is a timing diagram of the operation of the multiprocessor FIG. 7.

Consider the two processors 112 and 113 with a 3:5 proportion between their clocks. When an eight (=3+5) block 216 data frame 215 is to be processed, the faster processor 113 receives five blocks 216 through input gating function 217, with suitable input buffering at input buffer 239. Conversely, the slower processor 112 receives three blocks 216, also with suitable input buffering at input buffer 219. Corresponding buffering and gating of output blocks 226 by output buffers 220 and 240 and output gating function 218 takes place at the outputs of processors 112 and 113. The combination of the input-output systems and the processors is depicted in FIG. 7, and the timing diagram for the various functions is depicted in FIG. 8. The requisite relations that ascertain that both processors 112 and 113 will never be idle are presented in FIG. 9. Multiple 8-block 216 frame 215 versions can be derived as a trivial modification of FIGS. 7 and 8.

When the processor clock rates are related by a binary number, the slower clock is derived from a binary counter of the faster clock. As an extension, modulo-i counters become necessary for any integer, i, relation between the clock rates of Sections 4.1 and 4.2. For fractional clock rate relations, bit-slicing to rate, equaling the least common multiple of the two rates, becomes necessary. In the case presented here, a clock running 8/3-rd of the slow processor clock or 8/5-th of the fast processor clock can drive the entire system. All of the gating and processing functions can be triggered by a common clock 221 running at t'=t/15 rate.

4.4 Generalized Multiprocessor Structures

Figure 10:
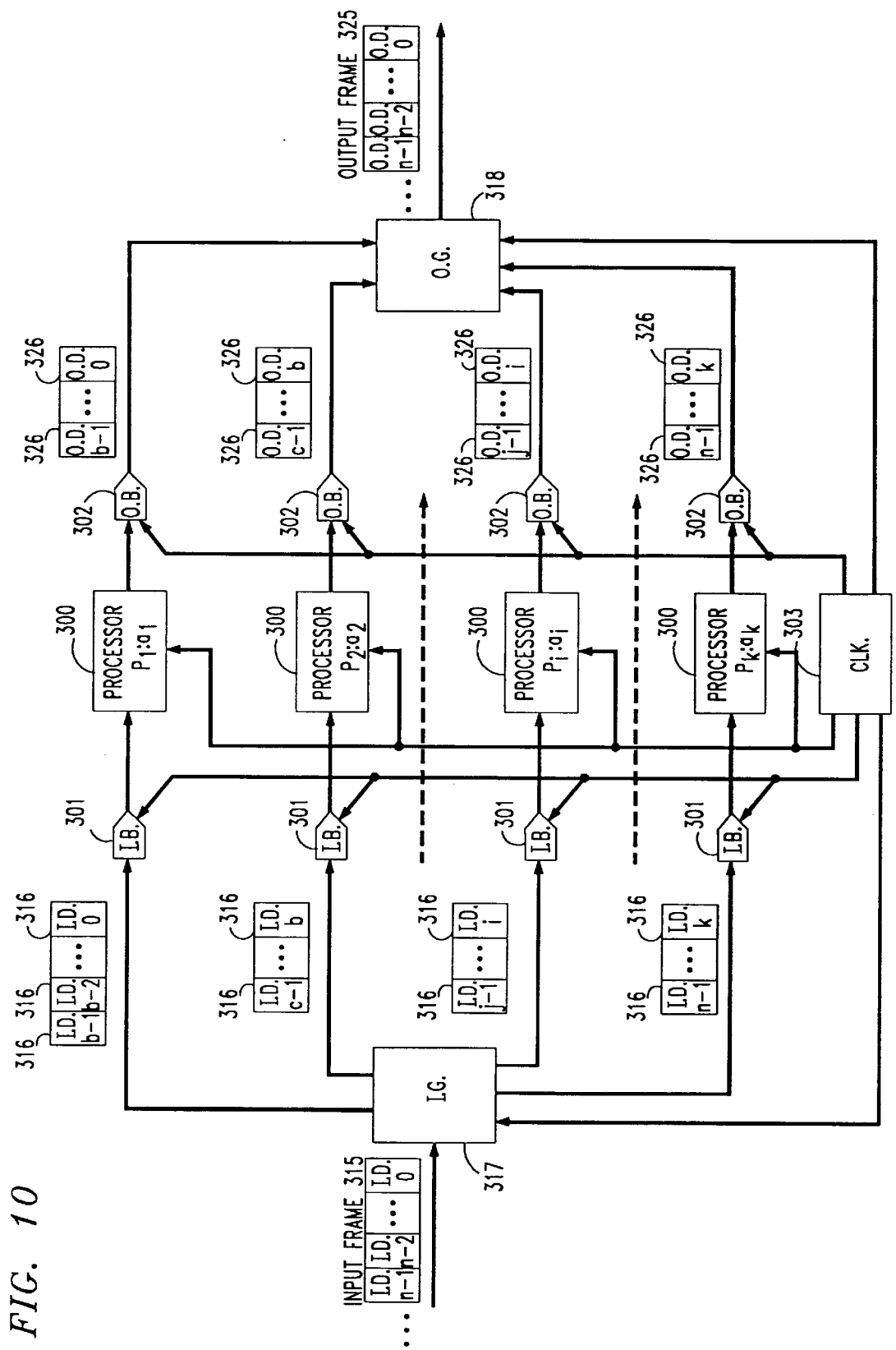
FIG. 10 is a block diagram of a multiprocessor embodying a fourth generalized, illustrative example of the invention.

In FIGS. 10–12, we have generalized the basic concepts that permit the conversion of sequential computing arrangements to their equivalent parallel arrangements using clocks of integer or fractional rates. FIG. 10 shows any number of processors 300, having any operating characteristics, connected in parallel, each being served at its input by an associated input buffer 301 and at its output by an associated output buffer 302. The input buffers 301 are connected to a common input point through an input gating function 317, and the output buffers 302 are connected to a common output point through an output gating function 318. The input gating function 317 distributes to the processors 300 sets of data blocks 316 of input frames 315. Each processor 300 processes the received data blocks 316 into output data blocks 326, which are gathered and assembled by the output gating function 318 into output frames 325. FIG. 11 shows which data blocks 316 are processed by which processor 300 and how fast. The operations of all elements of FIG. 10 are synchronized by a common clock 303. In general, it is emphasized that any arbitrary segment of a computing network can be replaced by such an arrangement. When the clock rates are adjusted properly, a data stream arriving at a uniform rate will pass through the newly-synthesized structure at the same rate and with the same delay as it would through the segment that the structure has replaced. In addition, the processors will be 100 percent utilized 100 percent of the time. The timing considerations to effect this result are shown in FIG. 12. The throughput of the structure will be faster than the throughput of the fastest single processor within that structure. The gating of various data blocks is simple and efficient. If the cost of the slower processors decreases at a rate faster than the clock rate, the structures proposed here will be cheaper than the higher-priced single-processor systems of the same speed. Alternatively, if the slower processors operate more dependably than the faster processors, then the system performance of the proposed configuration will be more dependable.

FIG. 10 depicts a generalized processor structure to process N-block 316 frames 315 of data. Data arrives uniformly at one block 316 per t seconds into a network with k processors 300 operating in parallel. The slowest processor $P_1$ processes $a_1$ blocks 316 of data in T seconds, and the fastest processor $P_k$ processes $a_k$ blocks 316 of data in the same duration of T seconds. The processor clock rates are related in the proportion $$1/a_1 : 1/a_2 : 1/a_3 : \ldots : 1/a_i : \ldots : 1/a_k.$$

If N is defined as $$N = \sum_{i=1}^{i=k} a_i,$$

then T is set such that

T=N·t seconds.

The i-th processor 300, clocking at $T/a_i$ rate per data block 316, will process data blocks m ... (n−1), and the i-th input and output buffers 301 and 302 will hold the same (unprocessed and processed, respectively,) data blocks, where $$m = \sum_{j=1}^{j=i-1} a_j \quad \text{and} \quad n = \sum_{j=1}^{j=i} a_j.$$

This equation simply indicates that the first processor $P_1$ will process data blocks 0 to ($a_1$−1), the second processor $P_2$ will process data blocks $a_1$ to ($a_1+a_2$−1), and so on. The buffers 301 and 302 for the first and second processors 30 will hold the corresponding data blocks. It should also be noted that the number of data blocks 316 processed by the i-th processor $P_i$ will be always equal $a_i$. The results are tabulated in FIG. 11.

The system delay is also an important consideration. It is apparent that the slowest processor clock will influence the overall delay through the architecture. If the slowest processor 300 can handle only one block 316 for the entire N·t seconds, then the processed data from this processor 300 is ready for delivery after N·t(=T) seconds. On the other hand, if the slowest processor 300 can handle $a_1$ blocks 316 of data, then the last (the $a_1$-th) block 316 to be processed will be ready for delivery T seconds after the first block 316 started its processing. Hence, the system delay is T seconds in the first case, or [T−($a_1$−1)·t] seconds in the second case. The system delay D is then written as D=[T−($a_1$−1)·t] seconds.

This representation of T is more general, since D becomes T if $a_1$=1. If the system delay is defined as D seconds, then it influences the waiting time in the output buffer. This effect is apparent in the last two rows of FIG. 12, discussed next.

The flow of $a_i$ blocks 316 of data in the i-th parallel branch of the configuration follows the duration and timing pattern presented in FIG. 12. The second column indicates the timing of the m-th block 316 as it is processed in the i-th processor branch of the architectural arrangement in FIG. 10. This block 316 enters the processor 300 upon arrival (with zero wait-time in the input buffer) for $N/a_i$ seconds, and then exists to the output buffer 301 as a processed data block. Here it waits for $(D-N \cdot t/a_i)$ seconds, starting from an instant $(m+N/a_i) \cdot t$ seconds to $(D+m \cdot t)$ seconds. At this time it exits out of the processor branch as an output data block 326.

The (m+1)st data block 316 follows the timing durations and instants in the third column, and so on. It is interesting to note the linear increase of the durations of data in the input buffer 301 for each consecutive data block 316, as shown by row one of FIG. 12. The processing time for each block 316 remains the same, at $N \cdot t/a_i$ seconds. The processed data blocks leave the processor 300 at an interval of one block per t seconds, which corresponds to the arrival time of each block 316, after an overall system delay of D seconds.

V. PIPELINED ARCHITECTURES WITH PROCESSORS OF DIFFERENT CLOCK RATES

Figure 13:
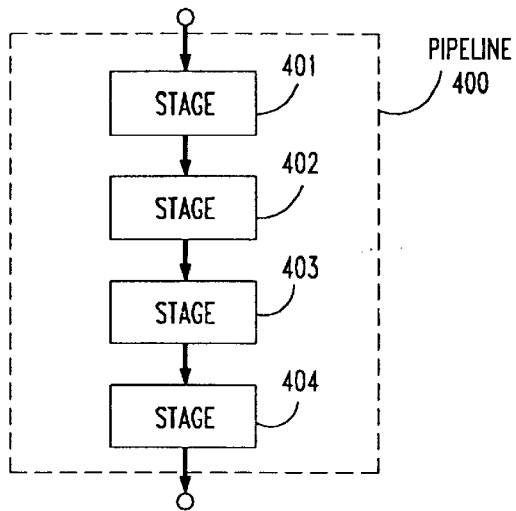
FIG. 13 is a block diagram of a conventional pipelined processor.

In pipelined architectures, the basic units described in Section 4 above, and illustrated in FIGS. 1, 4, 7, and 10, become the building blocks in the pipeline. The pipeline can be visualized as a chain of various production stages in which the completion time of all of the stages is uniform. Multiple processors of varying rates (discussed in Sections 3 and 4 above) can be freely used to construct any or each production stage in the pipeline. For example, if a conventional pipeline 400 has four stages 401, 402, 403, and 404, as shown in FIG. 13, then each of the stages needs the same finite amount of time for execution. That way, each one of the stages of the pipeline is continuously busy, with data blocks following in the 401, 402, 403, and 404 sequence through the pipeline 400.

Figure 14:
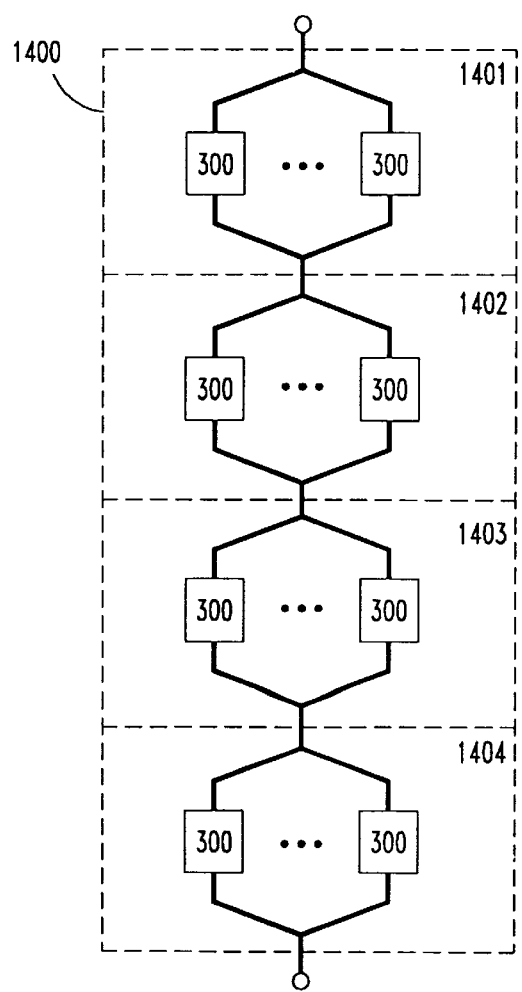
FIG. 14 is a block diagram of a pipelined processor embodying an illustrative example of the invention.

Now consider the case when the overall pipeline speed needs to be speeded up k times. This requires that the throughput of each of the stages is also enhanced k times. With conventional arrangements, this is not a trivial task, because every processor has to have a clock running k times faster. Even though some of the processors may be able to handle this clock rate, the slowest link in the chain holds down the overall pipeline speed. However, the arrangements presented here remove this restriction, and we may construct a pipeline 1400 whose average throughput is k times faster, with processors 300 (in each of the stages 1401, 1402, 1403, 1404 of the pipeline 1400) of different rates combined in any one of the structures shown in FIGS. 1, 4, 7, or 10 for each stage, as shown in FIG. 14. In general, it is emphasized that any arbitrary segment of a computing network can be replaced by a series, parallel, or series/parallel processor arrangement. In the case of single-chip multiprocessors, this relieves the burden on the VLSI chip manufacturers, who are generally not able to sustain a high yield on very fast chips.

VI. SIMD AND MIMD ARRANGEMENTS

The unity of control in a single-instruction, multiple-data arrangement (SIMD), or its diversity in a multiple-instruction, multiple-data arrangement (MIMD), is inconsequential to the structures presented here. In the SIMD applications (array processors, matrix operators, transform evaluators, etc.), the unified control may be shared from a single control unit and data may be channeled from a memory bank. The flow of data to and from the processors needs appropriate buffering and gating as discussed in Section 4. Control (or the opcode of the instruction) to each processor flows only once. In this case, the completion time for processors may be accurately sliced, and thus the data flow in and out of the various processors can be accurately synchronized. This synchronized operation is used to ascertain 100 percent processor utilization.

In the MIMD applications, where different tasks may exist within the same computing environment, the flow of programs and data from disk to memory needs to be gated and stored in active memory, such that independent processors of varying speeds may coexist. The processors that share in this environment might not be as algorithmically related as suggested in Section 4; however, if the faster processors handle longer tasks for the same amount of time, and vice versa, then the average delay for the job completion time can be maintained for short and long jobs. Further, the probability of taxing the DMA channels between disk and memory is reduced, since the average input and output rates in and out of the system follow a somewhat uniform rate. The operating system routines may already follow a job allocation strategy if processors of different rates coexist. The architecture presented in this discussion streamlines the job flow, if processor rates and processor allocations are coordinated with the expected duration for job completion.

VII. CONCLUSION

In Sections 4, 5, and 6 of this discussion, the freedom to generate computing structures with serial, or singly-parallel, or multiply-parallel, or serial singly-paralleled, or serial multiply-paralleled, arrangements was presented. The relation between clock rates of the various processors and the shift-in and shift-out times of the various buffers for holding raw data and the processed data are synchronized to ascertain maximal processor utilization. Thus, no processor is idle during the entire processing of long data sequences. The throughput of the structure is higher than the throughput of the fastest processor. When exact synchronization is not possible, the idle time of the processors will correspond to the duration dictated by the lack of correspondence between gating speed and processor maximum speed. We do not consider this as a major problem, since the fastest clock can be slowed by incremental amounts until synchronism is achieved. Even under these conditions, the throughput of the structure can be made higher than the throughput of the fastest processor.

Of course, it should be understood that various changes and modifications to the illustrative embodiments described above will be apparent to those skilled in the art. For example, a set of processors operating in parallel need not be synchronized by being clocked by signals derived from a single common clock; instead, each may have its own clock and only the clocks need be synchronized with each other. Or, the individual processors may take the reduced form of individual CPUs or even ALUs, depending upon system configuration. Furthermore, the gating functions can take any one of a variety of forms, such as simple conductor junctures, or simple logic gates on bus data leads. Or, the input gating function may exist only in virtual form, its functionality being assumed by a source of the input data that addresses the processors individually and sends data at any one time only to the addressed processor. Furthermore, in the pipelined configuration, the output gating function of a stage may be combined with, and also serve as, the input gating function of the next stage. In addition, the invention may advantageously be applied to neural computing networks, such as may be used for image processing of satellite surveillance or medical image data. Such changes and modifications can be made without departing from the spirit and the scope of the invention and without diminishing its attendant advantages. It is therefore intended that all such changes and modifications be covered by the following claims.

We claim:

1. A multiprocessor system comprising:

a plurality of processors operating in parallel and all operating synchronously with each other, at least some of the processors each operating to process a task at a different rate so that each processor of the at least some of the processors processes the task in a different amount of time than the other processors;

first means connected to the plurality of processors, for receiving a task comprising a sequence of a plurality of subtasks and distributing portions of the received task to individual ones of the processors for processing, each portion comprising at least one subtask and the subtasks of each portion sequential in said sequence, the portions being directly proportional in size to the operating rates of the individual processors so that each individual processor processes the portion of the task that is distributed to the individual processor in a same amount of time as the other processors process the portions distributed to them, the first means distributing sequential said portions to the plurality of processors in inverse order of the operating rates of the processors such that the processor having a lowest operating rate receives a first sequential one of the portions and the processor having a highest operating rate receives a last sequential one of the portions; and second means connected to the plurality of processors, for outputting results of the processing.

2. The multiprocessor system of claim 1 wherein the second means comprise:

means for receiving from the plurality of the processors the results of the processing and combining the results received from the plurality of processors into a common output, the results from the plurality of processors being combined sequentially in a same order as the portions which resulted in corresponding said results were received by the first means.

3. The system of claim 2 further comprising:

input buffering means connected to the first means and to individual ones of the plurality of processors and operating synchronously with the connected processors, for receiving the subtasks of individual said task portions sequentially and serially at a uniform rate and storing the task portions distributed by the first means to the connected processors, and inputting the stored task portions to the connected processors at rates synchronized with the operating rates of the connected processors such that the input buffering means input to an individual processor a subtask of a portion distributed to the individual processor immediately upon the individual processor completing processing of a subtask last input to the individual processor; and output buffering means connected to the individual ones of the plurality of processors and to the second means and operating synchronously with the plurality of processors, for receiving the results of the processing of each subtask of the portions distributed to the connected processors immediately upon the connected processors completing the processing of each said subtask and storing the results of the processing by the connected processors, and outputting the stored results at times and at rates synchronized with the operating rates of the plurality of processors such that the output buffering means output the results of processing of the subtasks of individual task portions at said uniform rate at which the input buffering means receive the subtasks of individual task portions.

4. The system of claim 2 wherein:

the task distributed to the plurality of processors comprises a first stream of data received by the first means at a uniform rate, the uniform rate a combined rate of processing of the data by the plurality of processors;

the results of the processing comprise processed data; and the common output comprises a second stream of processed said data output by the second means at the uniform rate.

5. The multiprocessor system of claim 1 wherein a processing throughput of the multiprocessor system is greater than a processing throughput of a processor of the plurality of processors which has a highest processing rate.

6. The multiprocessor system of claim 1 wherein:

the first means receive the plurality of subtasks serially in said sequence at a uniform rate synchronized with a throughput rate of the multiprocessor system of processing the subtasks, and the second means output the results of the processing of the subtasks serially in said sequence at the uniform rate.

7. The multiprocessor system of claim 6 wherein:

the uniform rate of receipt of individual subtasks is one subtask per time t, the plurality of processors comprise k processors $P_1$ through $P_k$, k being an integer, each processor $P_i$ processes $a_i$ subtasks in time T, wherein i=1 through k, and the task comprises N subtasks such that $$N = \sum_{i=1}^{i=k} a_i,$$

and T=N·t.

8. The multiprocessor system of claim 1 wherein:

the plurality of processors comprise k processors $P_1$ through $P_k$, k being an integer, each processor $P_i$ processes $a_i$ subtasks in time T, wherein i=1 through k, the task comprises N subtasks such that $$N = \sum_{i=1}^{i=k} a_i,$$

and the first means receive the N subtasks in the time T.

9. A multiprocessor system comprising:

a plurality of processors operating in parallel, each operating to process data at a different rate so that each processor processes a unit of data in a different amount of time than the other processors, and all operating synchronously with each other;

first means connected to the plurality of processors, for receiving a first stream of data comprising a sequence of a plurality of units of the data and distributing the received data to individual ones of the processors for processing, in amounts directly proportional to the operating rates of the individual processors so that each individual processor processes all of the data distributed to the individual processor in a same amount of time as the other processors, each amount comprising at least one unit of data and the units of data of each amount being sequentially received, the first means distributing sequentially-received said amounts to the plurality of processors in inverse order of the operating rates of the processors such that the processor having a lowest operating rate receives a first-received amount and the processor having a highest operating rate receives a last-received amount; and second means connected to the plurality of processors, for receiving from the processors processed data and combining the processed data received from the plurality of processors into a second stream of data.

10. The system of claim 5 further comprising:

input data buffering means connected to the first means and to at least some of the processors and operating synchronously with the connected processors, for receiving the units of data of individual said amounts sequentially and serially at a uniform rate and storing the units of data distributed by the first means to the connected processors, and inputting the stored units of data to the connected processors at rates synchronized with the operating rates of the connected processors such that the input data buffering means input to an individual processor a unit of data distributed to the individual processor immediately upon the individual processor completing processing of a unit of data last input to the individual processor; and output data buffering means connected to the at least some of the processors and to the second means and operating synchronously with the plurality of processors, for receiving the results of the processing of each unit of data distributed to the connected processors immediately upon the connected processors completing the processing of said each unit of data and storing data processed by the connected processors, and outputting the stored data at times and at rates synchronized with the operating rates of the plurality of processors such that the output data buffering means output the results of processing of the units of data of individual said amounts at said uniform rate.

11. The system of claim 9 wherein:

the first stream of data comprises a sequence of first data frames each including an identical amount of the units of data;

the first means distribute a different amount of the units of data from each first frame to each of the processors for processing, the amounts distributed to different processors from each first frame being in a same proportion as the operating rates of the processors; and the second means combine the processed data received from the processors into a sequence of second data frames each including an identical amount of the processed data and each including a different amount of processed data received from each of the processors, the amounts included in each second frame from different processors being in a same proportion as the operating rates of the processors.

12. The multiprocessor system of claim 9 wherein a processing throughput of the multiprocessor system is greater than a processing throughput of a processor of the plurality of processors which has a highest processing rate.

13. The multiprocessor system of claim 9 wherein:

the first means receive the plurality of units of the first stream of data serially in said sequence at a uniform rate synchronized with a throughput rate of the multiprocessor system of processing the units of the first stream of data, and the second means comprise means for outputting units of the second stream of data serially in said sequence at said uniform rate.

14. The multiprocessor system of claim 13 wherein:

the uniform rate of receipt of the units of the first stream of data is one unit per time t, the plurality of processors comprise k processors $P_1$ through $P_k$, k being an integer, each processor $P_i$ processes $a_i$ units of the first stream of data in time T, wherein i=1 through k, and the first stream of data comprises N units of data such that $$N = \sum_{i=1}^{i=k} a_i,$$

and T=N·t.

15. The multiprocessor system of claim 9 wherein:

the plurality of processors comprise k processors $P_1$ through $P_k$, k being an integer, each processor $P_i$ processes $a_i$ units of the first stream of data in time T, wherein i=1 through k, the first stream of data comprises N units of data such that $$N = \sum_{i=1}^{i=k} a_i,$$

and, the first means receive the N units of the first stream of data in the time T.

16. A pipelined multiprocessor system comprising:

a plurality of cascaded processing stages each operating to process data at a same rate so that each stage processes a unit of data in a same period of time as the other stages, and all operating synchronously with each other, at least one of the stages including a plurality of processors operating in parallel, each operating to process data at a different rate so that each processor processes a unit of data in a different amount of time than the other processors, and all operating synchronously with each other, first means connected to the plurality of processors, for receiving from outside of the stage a first stream of data comprising a sequence of a plurality of units of data and distributing the received data to individual ones of the processors for processing in amounts directly proportional to the operating rates of the individual processors so that each individual processor processes all of the data distributed to the individual processor in a same amount of time as the other processors, each amount comprising at least one unit of data and the units of data of each amount being sequentially received, the first means distributing sequentially-received said amounts to the plurality of processors in inverse order of the operating rates of the processors such that the processor having a lowest operating rate receives a first-received amount and the processor having a highest operating rate receives a last-received amount, and second means connected to the plurality of processors, for receiving from the processors processed data and combining the processed data received from the plurality of processors into a second stream of data sent outside of the stage.

17. The system of claim 16 wherein:

the first stream of data comprises a sequence of first data frames each including an identical amount of units of data;

the first means distribute a different amount of the units of data from each first frame to each of the processors for processing, the amounts distributed to different processors from each first frame being in a same proportion as the operating rates of the processors; and the second means combine the processed data received from the processors into a sequence of second data frames each including an identical amount of the processed data and each including a different amount of processed data received from each of the processors, the amounts included in each second frame from different processors being in a same proportion as the operating rates of the processors.

18. The multiprocessor system of claim 16 wherein a processing throughput of the multiprocessor system is greater than a processing throughput of a processor of the plurality of processors which has a highest processing rate.

19. The multiprocessor system of claim 19 wherein:

the first means receive the plurality of units of the first stream of data serially in said sequence at a uniform rate synchronized with a throughput rate of the multiprocessor system of processing the units of the first stream of data, and the second means comprise means for outputting units of the second stream of data serially in said sequence at said uniform rate.

20. The multiprocessor system of claim 19 wherein:

the uniform rate of receipt of the units the first stream of data is one unit per time t, the plurality of processors comprise k processors $P_1$ through $P_k$, k being an integer, each processor $P_i$ processes $a_i$ units of the first stream of data in time T, wherein i=1 through k, and the first stream of data comprises N units of data such that $$N = \sum_{i=1}^{i=k} a_i,$$

and T=N·t.

21. The multiprocessor system of claim 16 wherein:

the plurality of processors comprise k processors $P_1$ through $P_k$, k being an integer, each processor $P_i$ processes $a_i$ units of the first stream of data in time T, wherein i=1 through k, the first stream of data comprises N units of data such that $$N = \sum_{i=1}^{i=k} a_i,$$

and, the first means receive the N units of the first stream of data in the time T.

22. A method of operating a multiprocessor system comprising a plurality of processors operating in parallel and all operating synchronously with each other, at least some of the processors each operating to process a task at a different rate so that each processor of the at least some of the processors processes the task in a different amount of time than the other processors, comprising the steps of:

receiving a task comprising a sequence of a plurality of subtasks;

distributing portions of the received task to individual ones of the processors for processing, each portion comprising at least one subtask and the subtasks of each portion sequential in said sequence, the portions being directly proportional in size to the operating rates of the individual processors and sequential said portions being distributed to the plurality of processors in inverse order of the operating rates of the processors such that the processor having a lowest operating rate receives a first sequential one of the portions and the processor having a highest operating rate receives a last sequential one of the portions;

processing the distributed portion received at each processor at the rate of the receiving processor so that each individual processor processes the portion of the task that is distributed to the individual processor in a same amount of time as the other processors process the portions distributed to them; and outputting results of the processing.

23. The method of claim 22 wherein the step of outputting comprises the steps of receiving from the plurality of the processors the results of the processing; and sequentially combining the results received from the plurality of processors into a common output, in a same order as the portions which resulted in corresponding said results were ordered in the received task.

24. The method of claim 23 in a multiprocessor system further comprising input buffers and output buffers connected to individual ones of the plurality of processors and operating synchronously with the connected processors, wherein:

the step of processing is preceded by the further steps of receiving the subtasks of individual said task portions sequentially and serially at a uniform rate and storing the task portions distributed to the connected processors in the input buffers, and inputting the stored task portions to the connected processors from the input buffers at rates synchronized with the operating rates of the connected processors such that a subtask of a portion distributed to an individual processor is input to the individual processor immediately upon the individual processor completing processing of a subtask last input to the individual processor; and the step of receiving from the processors comprises the steps of receiving the results of the processing of each subtask of the portions distributed to the connected processors immediately upon the connected processors completing the processing of each said subtask and storing the results of the processing by the connected processors in the output buffers, and outputting the stored results at times and at rates synchronized with operating rates of the plurality of processors such that the results of processing of the subtasks of individual task portions are output at said uniform rate at which the subtasks of individual task portions were received.

25. The method of claim 23 wherein
the step of receiving a task comprises the step of
receiving a first stream of data at a uniform rate, the uniform rate being a combined rate of processing of the data by the plurality of processors;
the step of receiving the results of the processing comprises the step of
receiving processed data; and
the step of outputting results comprises the step of
outputting a second stream of processed said data at the uniform rate.

26. The method of claim 22 wherein
a processing throughput of the multiprocessor system is greater than a processing throughput of a processor of the plurality of processors which has a highest processing rate.

27. The method of claim 22 wherein:
the step of receiving a task comprises the step of
receiving the plurality of subtasks serially in said sequence at a uniform rate synchronized with a throughput rate of the multiprocessor system of processing the subtasks, and
the step of outputting results of the processing comprises the step of
outputting the results of the processing of the subtasks serially in said sequence at the uniform rate.

28. The method of claim 27 wherein:
the uniform rate of receipt of individual subtasks is one subtask per time t,
the plurality of processors comprise k processors $P_1$ through $P_k$, k being an integer,
the step of processing comprises the step of
at each processor $P_i$, processing $a_i$ subtasks in time T, wherein i=1 through k, and
the task comprises N subtasks such that $$N = \sum_{i=1}^{i=k} a_i,$$

and T=N·t.

29. The method of claim 22 wherein:
the plurality of processors comprise k processors $P_1$ through $P_k$, k being an integer,
the step of processing comprises the step of
at each processor $P_i$, processing a i subtasks in time T, wherein i=1 through k, and
the step of receiving a task comprises the step of
receiving the N subtasks in the time T such that $$N = \sum_{i=1}^{i=k} a_i.$$

30. A method of operating a multiprocessor system comprising a plurality of processors operating in parallel, each operating to process data at a different rate, and all operating synchronously with each other, comprising the steps of:
receiving a first stream of data comprising a sequence of a plurality of units of the data;
distributing the received data to individual ones of the processors for processing, in amounts directly proportional to the operating rates of the individual processors, each amount comprising at least one unit of data and the units of data of each amount sequentially received, sequentially-received said amounts being distributed to the plurality of processors in inverse order of the operating rates of the processors such that the processor having a lowest operating rate receives a first-received amount and the processor having a highest operating rate receives a last-received amount;
processing the distributed data received at each processor at the rate of the receiving processor so that each individual processor processes a unit of the distributed data in a different amount of time and processes all of the data distributed to the individual processor in a same amount of time as the other processors;
receiving from the processors processed data; and
combining the processed data received from the plurality of processors into a second stream of data.

31. The method of claim 30 in a multiprocessor system further comprising input data buffers and output data buffers connected to at least some of the processors and operating synchronously with the connected processors, wherein:
the step of processing is preceded by the further steps of
receiving the units of data of individual said amounts sequentially and serially at a uniform rate and storing the units of data distributed to the connected processors in the input data buffers, and
inputting the stored units of data to the connected processors from the input buffers at rates synchronized with the operating rates of the connected processors such that a unit of data distributed to an individual processor is input to the individual processor immediately upon the individual processor completing processing of a unit of data last input to the individual processor; and
the step of receiving from the processors comprises the steps of
receiving the results of the processing of each unit of data distributed to the connected processors immediately upon the connected processors completing the processing of said each unit of data and storing data processed by the connected processors in the output data buffers, and
outputting the stored data at times and at rates synchronized with operating rates of the plurality of processors such that the result of processing of the units of data of individual said amount are output at said uniform rate.

32. The method of claim 30 wherein:
the step of receiving a first stream of data comprises the step of
receiving a first stream of data comprising a sequence of first data frames each including an identical amount of the units of data;
the step of distributing comprises the step of
distributing a different amount of the units of data from each first frame to each of the processors for processing, the amounts distributed to different processors from each first frame being in a same proportion as the operating rates of the processors; and
the step of combining comprises the step of
combining the processed data received from the processor into a sequence of second data frames each including the identical amount of the processed data and each including a different amount of processed data received from each of the processors, the amounts included in each second frame from different processors being in a same proportion as the operating rates of the processors.

33. The method of claim 30 wherein a processing throughput of the multiprocessor system is greater than a processing throughput of a processor of the plurality of processors which has a highest processing rate.

34. The method of claim 30 wherein:

the step of receiving a first stream of data comprises the step of receiving the plurality of units of the first stream of data serially in said sequence at a uniform rate synchronized with a throughput rate of the multiprocessor system of processing the units of the first stream of data, and the step of combining the processed data comprises the step of outputting units of the second stream of data serially in said sequence at said uniform rate.

35. The method of claim 34 wherein:

the uniform rate of receipt of the units of the first stream of data is one unit per time t, the plurality of processors comprise k processors $P_1$ through $P_k$, k being an integer, the step of processing comprises the step of at each processor $P_i$, processing $a_i$ units of the first stream of data in time T, wherein i=1 through k, and the first stream of data comprises N units of data such that $$N = \sum_{i=1}^{i=k} a_i,$$

and T=N·t.

36. The method of claim 30 wherein:

the plurality of processors comprise k processors $P_1$ through $P_k$, k being an integer, the step of processing comprises the step of at each processor $P_i$, processing $a_i$ units of the first stream of data in time T, wherein i=1 through k, and the step of receiving a first stream of data comprises the step of receiving N units of the first stream of data in the time T such that $$N = \sum_{i=1}^{i=k} a_i.$$

* * * * *